United States Patent Office 3,523,983
Patented Aug. 11, 1970

3,523,983
OLIGOMERISATION OF OLEFINES
Arthur Gough, Norton-on-Tees, England, assignor to Imperial Chemical Industries Limited, London, England, a corporation of Great Britain
No Drawing. Filed May 3, 1967, Ser. No. 635,679
Claims priority, application Great Britain, May 6, 1966, 20,071/66
Int. Cl. C07c *3/18*
U.S. Cl. 260—683.15                                       5 Claims

ABSTRACT OF THE DISCLOSURE

A process for oligomerising an olefine to a product that is predominantly a direct dimer or direct codimer of the olefine, wherein the oligomerisation is effected using as catalyst a solution of a rhodium or ruthenium salt dissolved in a hydrocarbon solvent incorporating a proportion of water, hydrogen or a hydride.

---

This invention relates to the oligomerisation of olefines. Throughout this specification the term oligomerisation is to be taken to include dimerisation.

According to the present invention there is provided a process for the oligomerisation of olefines which comprises bringing at least one olefine into contact with a solution of a salt of a noble metal of Group 8 of the Periodic Table in a hydrocarbon which is maintained in the liquid phase.

Preferably the noble metal of Group 8 is rhodium or ruthenium. Preferred salts are the halides, especially the chlorides such as rhodium trichloride. The salt may be hydrated or anhydrous but when using anhydrous salts it is necessary to provide a reducing agent for the reaction to proceed easily unless sufficient water is present to form a hydrated salt. Preferred reducing agents are hydrogen or alkali metal aluminum hydrides. The use of alkali metal aluminum hydrides enables higher molecular weight oligomers of olefines to be produced more easily.

In order to improve the solubility of the salt in the hydrocarbon, a ligand capable of forming a co-ordinate bond with the noble metal may be added to the reaction mixture. Examples of suitable ligands are primary, secondary or tertiary amines, phosphines or arsines and alkyl, aryl or cycloalkyl phosphites, sulphides or sulphones. Preferred ligands are tertiary phosphines such as the trialkyl phosphines.

In addition to noble metal salt dissolved in the hydrocarbon further quantities of noble metal salt may be present in the reaction mixture.

The hydrocarbon may be a paraffin, cycloparaffin or an aromatic hydrocarbon. It is preferably benzene.

The process of the invention is applicable to the oligomerisation of a wide variety of olefines, it is especially useful for preparing oligomers, particularly dimers, of linear terminal and non-terminal mono-olefines having up to 4 carbon atoms in the molecule. By using a mixture of olefines as the starting material, the invention may be applied to the preparation of co-dimers of olefines. Thus propylene may be dimerised to n-hexene and methyl pentene; butene-1 yields no-octane and methyl heptene; butene-2 yields largely dimethyl hexene; mixtures of ethylene and butene-1 yield a product containing mainly hexene-2; and mixtures of propylene with butene-1 yields mixtures of the methyl-hexenes.

One important advantage of the process of the invention is that isomerisation of the primary dimer product is suppressed to a marked extent and thus the product contains a major proportion of primary product. Thus, in the dimerisation of ethylene to which the process of the invention is particularly applicable, a high ratio of butene-1 to butene-2 is obtained. This is a very desirable result since butene-1 is a more valuable monomer in polymerisation processes for example, dimerisation processes, butene-2. If the hydrocarbon solvent is replaced by an oxygen-containing solvent, such as methanol, as in prior proposals for the dimerisation of ethylene, the butene produced consist of a major proportion of butene-2 and a very small proportion of butene-1.

The process of the invention is preferably carried out at a temperature of 120° C. to 210° C. The pressure should be sufficient to maintain the hydrocarbon solvent on the liquid phase and may be, for example, up to 2,500 atmospheres.

EXAMPLE 1

An autoclave of 100 ml. capacity was charged with 0.132 gram ($5 \times 10^{-4}$ mole) of rhodium trichloride trihydrate and 20 ml. of benzene and ethylene introduced until the pressure was 425 atmospheres at room temperature. The temperature was then raised to 180° C., the pressure rising to 990 atmospheres. After 15 minutes, when the pressure had fallen to 750 atmospheres, the autoclave was cooled and the pressure let down. 0.75 mole of butene were produced, the ratio of butene-1 to butene-2 being 4.5:1.

EXAMPLE 2

An autoclave of 100 ml. capacity was charged with 0.194 gram of anhydrous rhodium trichloride and 20 ml. of benzene. Hydrogen was then introduced into the autoclave until the pressure reached 40 atmospheres followed by ethylene until the total pressure reached 375 atmospheres at room temperature. The temperature was raised to 180° C., the pressure rising to 840 atmospheres. After maintaining this temperature for 1 hour the pressure had fallen to 610 atmospheres and after cooling and letting down the pressure it was found that 0.9 mole of butene had been produced. The ratio of butene-1 to butene-2 was 2:1.

EXAMPLE 3

An autoclave of 100 ml. capacity was charged with 0.033 gram of anhydrous rhodium trichloride, 0.168 gram of lithium aluminum hydride and 20 ml. benzene. Ethylene was then introduced into the autoclave until the pressure reached 465 atmospheres at room temperature. The temperature was raised to 180° C., the pressure rising to 1,050 atmospheres. After maintaining this temperature for 1 hour the pressure had fallen to 1,020 atmospheres. The autoclave was then cooled and the pressure let down. 1 gram of liquid product was obtained containing liquid hydrocarbons having up to 22 carbon atoms in the molecule. A gaseous product was also obtained in which the ratio of butene-1 to butene-2 was 8:1.

I claim:
1. A process for oligomerising an olefine feedstock consisting essentially of at least one olefine selected from the group consisting of ethylene, propylene, butene-1 and butene-2 to a product that is predominately a direct dimer or codimer of said olefine which consists essentially of effecting the oligomerising of the said feedstock with a rhodium halide catalyst dispersed in benzene containing at least one member selected from the group consisting of water, hydrogen and an alkali metal aluminum hydride.

2. A process as claimed in claim 1 in which the temperature is maintained within the range 120° to 210° C.

3. A process as claimed in claim 1 wherein the catalyst is a hydrated rhodium salt.

4. A process as claimed in claim 1 wherein the catalyst is an anhydrous rhodium salt and contains an alkali metal aluminum hydride.

5. A process as claimed in claim 1 wherein ethylene is dimerised to a mixture of butenes in which butene-1 predominates.

References Cited

Cramer: J. Am. Chem. Soc., vol. 87, No. 21, November 1965, pages 4717–4727.

Alderson et al: J. Am. Chem. Soc., vol. 87, No. 24, December 1965, pages 5638–5645.

PAUL M. COUGHLAN, Jr., Primary Examiner

U.S. Cl. X.R.

252—441